(12) United States Patent
Miyamoto

(10) Patent No.: US 8,736,868 B2
(45) Date of Patent: May 27, 2014

(54) IMAGE FORMING APPARATUS

(75) Inventor: Kenji Miyamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1750 days.

(21) Appl. No.: 11/519,815

(22) Filed: Sep. 13, 2006

(65) Prior Publication Data

US 2007/0058197 A1   Mar. 15, 2007

(30) Foreign Application Priority Data

Sep. 14, 2005 (JP) .................................. 2005-266331
Oct. 20, 2005 (JP) .................................. 2005-305758

(51) Int. Cl.
*G06F 3/12* (2006.01)

(52) U.S. Cl.
USPC .......... 358/1.15; 358/1.1; 358/538; 358/1.13; 358/1.14

(58) Field of Classification Search
USPC .................................. 358/1.15, 538, 1.9, 1.1
See application file for complete search history.

(56) References Cited

FOREIGN PATENT DOCUMENTS

| JP | 3-266561 | 11/1991 |
|---|---|---|
| JP | 11-119952 | 4/1999 |
| JP | 3098755 | 8/2000 |
| JP | 2002-171368 | 6/2002 |
| JP | 2004-114453 | 4/2004 |
| JP | 2004-186784 | 7/2004 |

*Primary Examiner* — King Poon
*Assistant Examiner* — Iriana Cruz
(74) *Attorney, Agent, or Firm* — Smith, Gambrell & Russell, LLP

(57) ABSTRACT

In a multifunction peripheral (MFP), when an interface portion receives a print job, a control portion extracts image data of one page after another from the print job, and then stores in a RAM the extracted image data of one page after another along with corresponding page IDs (page numbers) associated therewith. After the image data contained in the print job starts to be printed, when a touch panel liquid crystal display accepts an output-change instruction to end printing immediately after a specified page Q prior to the last page of the image data of the image data stored in the RAM, only image data up to and inclusive of the specified page Q is output.

3 Claims, 8 Drawing Sheets

IMAGE FORMING APPARATUS

This application is based on Japanese Patent Application No. 2005-266331 filed on Sep. 14, 2005 and Japanese Patent Application No. 2005-305758 filed on Oct. 20, 2005, the contents of both of which are hereby incorporated by reference.

BACKGROUND OF THE INVENTION

1. Field of the Invention

The present invention relates to an image forming apparatus such as a copier, a printer, or a multifunction peripheral (MFP), and more particularly relates to a technology for managing print jobs therein.

2. Description of Related Art

In a conventional image forming apparatus, when a print job containing image data amounting to a plurality of pages is received from a personal computer, the print job in its entirety is sent from a control portion of the image forming apparatus to an engine control portion thereof that controls an engine portion thereof for performing printing, so that the print job is executed on paper under the control of the engine control portion. In order to change the number of pages to be output through a print job that is currently being executed, first the print job is canceled and then a new print job with a changed number of pages to be output is received. In this way, the number of pages to be output is changed.

As a conventional example, JP-A-2004-186784 discloses and proposes an image forming apparatus provided with: display means for displaying operation guides; operation means for accepting operation instructions; page-specification-accepting means for making the display means display operation guides and also for accepting, via the operation means, page-specification instructions that specify a page or pages not to be copied of an original document consisting of a plurality of pages; and copy means for copying the images of the original document excluding the page or pages specified not to be copied by the page specification means when a page-specification instruction is accepted by the page-specification-accepting means.

Accordingly, in the conventional image forming apparatus, in order to change the number of pages to be output through a print job that is currently being executed, first the print job is canceled and then a new print job with a changed number of pages to be output is received, and in this way the number of pages to be output through the print job can be changed.

Furthermore, with the image forming apparatus disclosed in JP-A-2004-186784, when copying an original document consisting of a plurality of pages, it is possible to copy images acquired from the pages thereof other than those specified.

However, in the conventional image forming apparatus, since a print job is sent in its entirety from the control portion to the engine control portion, which then performs printing, it is impossible to change the number of pages to be output through a print job that is currently being executed without canceling the print job. Hence, in order to change the number of pages to be output through a print job that is currently being executed or in order to change the first page to be printed in a print job that is currently being executed to any page posterior to the current first page, the user needs to cancel the print job and then operate such that a new print job with a changed number of pages is transmitted to the apparatus. Thus, disadvantageously, it takes extra time to cancel an existing printing job and transmit a new print job.

Incidentally, the image forming apparatus disclosed in JP-A-2004-186784 involves an invention directed to changing the pages of an original document to copy when it is copied. Here, before images acquired from the original document start to be copied, the pages that do not need to be copied need to be specified.

SUMMARY OF THE INVENTION

In view of the above described problems, an object of the present invention is to provide an image forming apparatus that permits, with respect to a print job that is currently being executed, the number of pages to be output to be changed without canceling the print job. Another object of the present invention is to provide an image forming apparatus that permits, with respect to a print job that is currently being executed, the first page of printing to be changed without canceling the print job.

To achieve the above objects, according to one aspect of the present invention, an image forming apparatus is provided with: an information-accepting portion for accepting input of information; an interface portion for establishing communication with an external device; a printing portion for printing, on paper, image data contained in a print job received by the interface portion; a storage portion for storing predetermined data; an extraction portion that, when the interface portion receives a print job, extracts image data of one page after another from the print job and then stores the extracted image data of one page after another along with corresponding page numbers associated therewith in the storage portion; and a page-change portion that, after the printing portion starts to print the image data, when the information-accepting portion accepts an output-change instruction to end printing immediately after a specified page prior to a last page of the image data, instructs the printing portion to output, of the image data stored in the storing portion, only image data up to and inclusive of the specified page.

With this structure, after the image data contained in a print job starts to be printed, when the user wants to change the number of pages to be output, he/she can change it without canceling the print job.

Also, to achieve the above objects, according to another aspect of the present invention, an image forming apparatus is provided with: an information-accepting portion for accepting input of information; an interface portion for establishing communication with an external device; a printing portion for printing, on paper, image data contained in a print job received by the interface portion; a storage portion for storing predetermined data; an extraction portion that, when the interface portion receives a print job, extracts image data of one page after another from the print job and then stores the extracted image data of one page after another along with corresponding page numbers associated therewith in the storage portion; a print-copy-number-extraction portion that extracts, from the print job received by the interface portion, a predetermined number of copies of the image data to be printed; a count portion that counts a current number of printed copies, that is, a number of copies that have already been printed, and that counts a number of a current page of the image data that is about to be printed; and a page-change portion that, after the printing portion starts to print the image data, when the information-accepting portion accepts an output-change instruction to start printing at a specified page posterior to a first page of the image data, if, based on a counting result by the count portion, the current page is found to be the first page, instructs the printing portion to output, starting with a current copy, among the image data stored in the storage portion, only image data corresponding to the specified and all following pages, and in contrast, if, based on a counting result by the count portion, the current page is found not to be the first page, instructs the printing portion to output, starting with an immediately following copy, among the image data stored in the storage portion, only image data corresponding to the specified page and all following pages.

With this structure, after the image data contained in a print job starts to be printed, when the user wants to change the first page of printing, the user can change it without canceling the print job.

Also, in the image forming apparatus structured as described above, the information-accepting portion is an operation portion for accepting input of information through operation thereof.

With this structure, the user can easily change the number of pages to be output or the first page of printing solely by operating an operation portion such as a touch panel display, a numeric keypad, or the like.

Also, in the image forming apparatus structured as described above, the information-accepting portion is a member for accepting input of information via the interface portion. With this structure, the user does not need to go up to the image forming apparatus to change the number of the pages to be output or the first page of printing, and this makes the image forming apparatus even more user-friendly.

As described above, with an image forming apparatus according to the present invention, after the image data contained in a print job starts to be printed, it is possible to change the number of pages to be output or the first page of printing without canceling the print job.

DETAILED DESCRIPTION OF PREFERRED EMBODIMENTS

Figure 1:
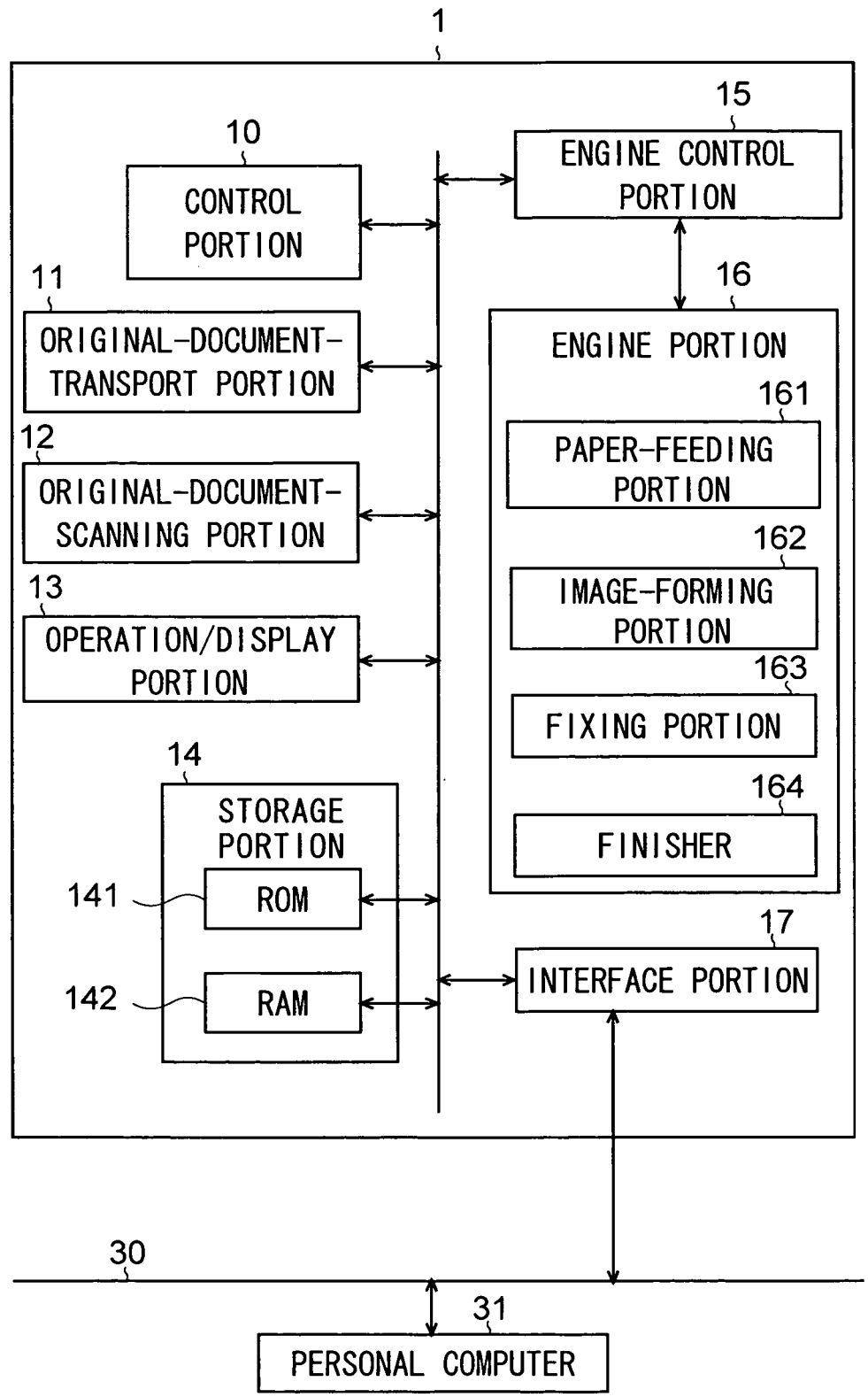
FIG. 1 is a block diagram showing the structure of a principal part of a multifunction peripheral (MFP) according to the present invention.
Figure 2:
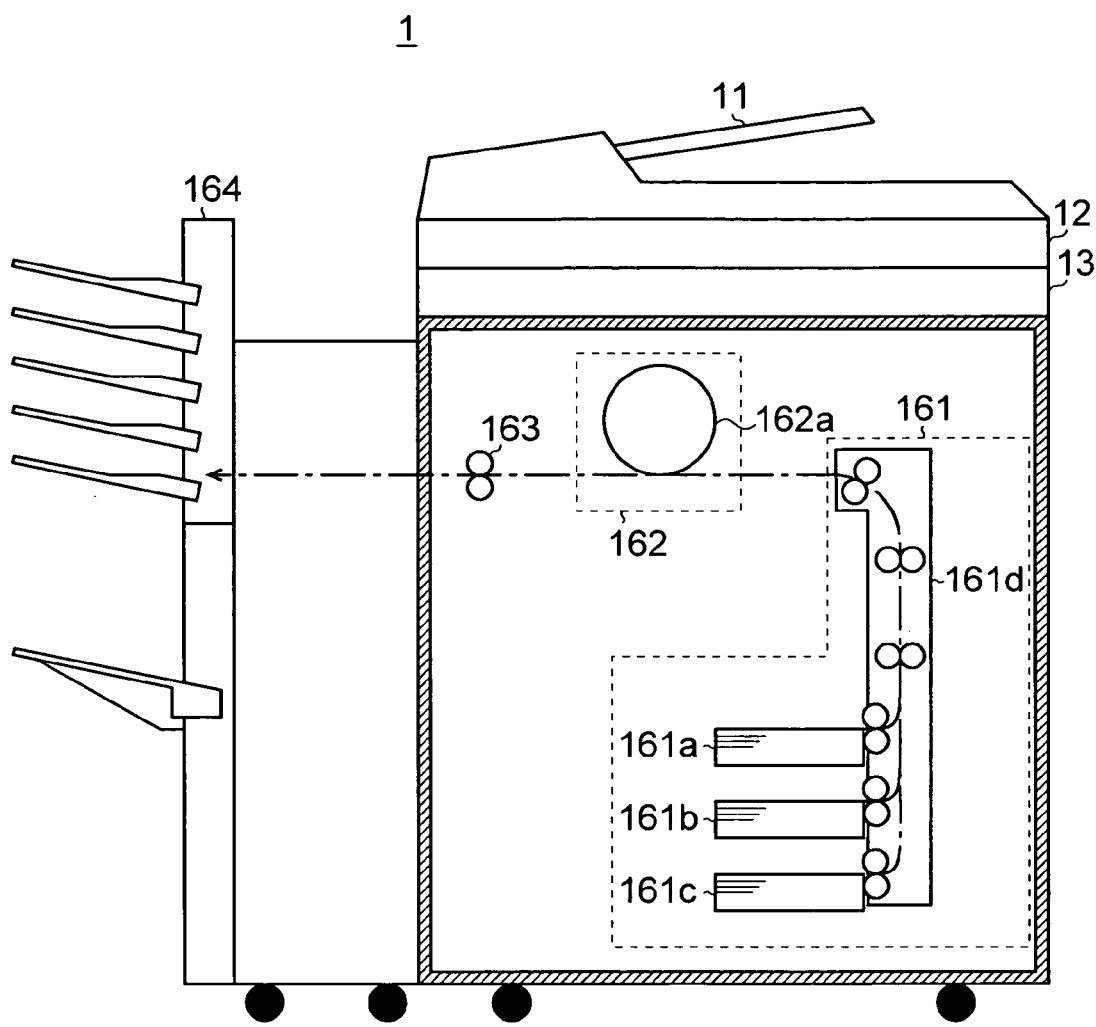
FIG. 2 is a vertical sectional view schematically showing the structure of a principal part of the multifunction peripheral (MFP) according to the present invention.

Hereinafter, an embodiment of the present invention will be described that deals with a case in which the present invention is applied to a multifunction peripheral (MFP) having a printer function and a copier function. FIG. 1 is a block diagram showing the structure of a principal part of a multifunction peripheral (MFP) according to the present invention. FIG. 2 is a vertical sectional view schematically showing the structure of a principal part of the multifunction peripheral (MFP) according to the present invention. As shown in FIGS. 1 and 2, a multifunction peripheral (MFP) 1 of this embodiment is provided with: a control portion 10 for controlling the operation of the whole peripheral; an original-document-transport portion 11 for automatically transporting an original document; an original-document-scanning portion 12 that scans the original document transported thereto by the original-document-transport portion 11 to generate image data of the original document; an operation/display portion 13 composed of an operating portion (such as a numeric keypad or a touch panel) that accepts input of information through operation thereof and a display portion (such as a liquid crystal display); a storage portion 14 for storing a variety of control programs and the like and also for use as a work area; an engine portion 16 that, under the control of an engine control portion 15 (described later), performs the printing of an image on paper based on the image data and that performs post processing with respect to the printed paper; an engine control portion 15 for controlling the engine portion 16 based on a command from the control portion 10; and an interface portion 17 connected to a network 30 to establish communication with external devices. Incidentally, the multifunction peripheral (MFP) 1 is capable of sending and receiving data to and from a personal computer 31 (described later) via the network 30.

The control portion 10, besides controlling the operation of the whole peripheral, feeds various commands to the engine control portion 15 to make the engine control portion 15 control the engine portion 16. Also, the control portion 10 serves as: an extraction portion that, when the interface portion 17 receives a print job, extracts image data of one page after another from the print job and that stores the extracted image data of one page after another along with corresponding page numbers associated therewith in a RAM 142 (the storage portion); and a page-change portion that, after the image data contained in the print job starts to be printed, when an information-accepting portion (in this embodiment, the touch panel liquid crystal display 131 of the operation/display portion 13, which will be described later, accepts an output-change instruction to end printing immediately after a specified page prior to the last page of the image data, instructs the printing portion (in this embodiment, the engine control portion 15, a paper-feeding portion 161, an image-forming portion 162, and a fixing portion 163) to output, of the image data stored in the RAM 142, only image data up to and inclusive of the specified page.

The operation portion 10 further serves as: a print-copy-number-extraction portion that extracts, from the print job received by the interface portion 17, a predetermined number of copies of the image data to be printed; a count portion that counts the current number of printed copies, that is, the number of copies that have already been printed and that finds the number of a current page that is about to be printed; and a page-change portion that, after the printing portion starts to print the image data, when the information-accepting portion accepts an output-change instruction to start printing at a specified page posterior to the first page of the image data, if, based on a counting result by the count portion, the current page is found to be the first page, instructs the printing portion to output, starting with a current copy, among the image data stored in the storage portion, only image data corresponding to the specified and all the following pages, and in contrast, if, based on a counting result by the count portion, the current page is found not to be the first page, instructs the printing portion to output, starting with an immediately following copy, among the image data stored in the storage portion, only image data corresponding to the specified and all the following pages.

The engine portion 16 is provided with: the image-forming portion 162 (including a printing portion 162a having a development unit, a photoconductive drum, an exposure unit, and the like) for forming on paper a toner image based on the image data; the fixing portion 163 for fixing a toner image formed on paper in the image-forming portion 162; the paper-feeding portion 161 for feeding paper to the image-forming portion 162; and a finisher 164 for performing post processing with respect to paper that has passed through the fixing portion 163.

The finisher 164 is provided with a plurality of tiers of trays, a sort portion that performs paper-stack-ejection processing in which a plurality of sheets of paper are stacked to be ejected onto the trays, and a staple portion for performing stapling in which a plurality of sheets of paper are stacked and stapled to be ejected onto the trays.

The paper-feeding portion 161 is provided with: a plurality of tiers (in this embodiment, three tiers) of paper-accommodation portions 161a to 161c from which paper is fed to the image-forming portion 162; and a paper-transport portion 161d that serves as a common paper-transporting passage through which paper is transported from any one of the paper-accommodation portions 161a to 161c to the image-forming portion 162.

The storage portion 14 is provided with a ROM (read only memory) 141 in which various control programs or the like are stored and the RAM (random access memory) 142 for use as a work area.

Figure 3:
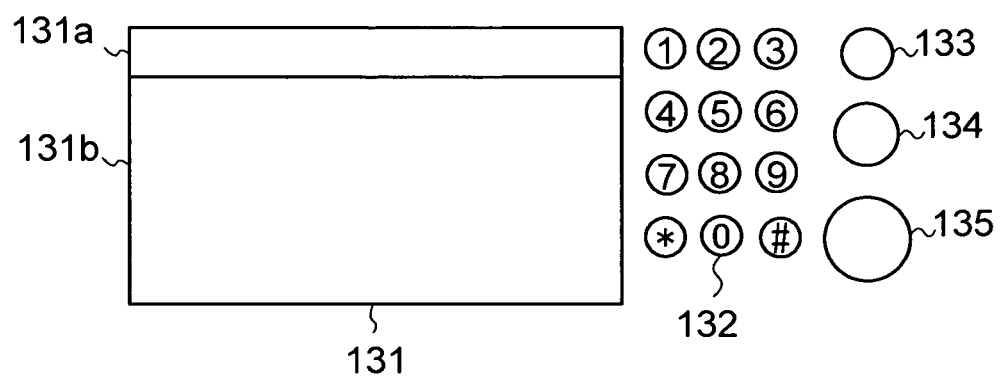
FIG. 3 is a diagram showing an example of an operation/display portion 13 in a multifunction peripheral (MFP) 1.

Also, FIG. 3 is a view showing an example of the operation/display portion 13 of the multifunction peripheral (MFP) 1 embodying the present invention. The operation/display portion 13 is provided with: the touch panel liquid crystal display 131 that accepts input of information through touch operation thereof and that displays images; a numeric keypad 132 for accepting input of numeric information and the like; a clear key 133 that, by being pressed by the user, accepts erasure of specified information; a stop key 134 that, by being pressed by the user, accepts the stopping of copying or printing operation; and a start key 135 that, by being pressed by the user, accepts the starting of copying operation.

Also, the liquid crystal display 131 is further provided with a status-display portion 131a for displaying the status of the peripheral and a main display portion 131b for displaying various kinds of process information.

Also, though not so illustrated, the personal computer 31 connected to the network 30 has a variety of programs, data, or the like stored therein, and is provided with a storage portion that may also be used as a work area, a display for displaying images, an input device by means of which the user performs input operation, a control portion for controlling the whole personal computer 31, an interface for establishing communication with external devices, and the like. The personal computer 31 can send and receive data, print data, and the like to and from external devices such as the multifunction peripheral (MFP) 1.

Now, the original-document-copying operation performed in the multifunction peripheral (MFP) 1 structured as described above will be described. In the original-document-copying operation performed in the multifunction peripheral (MFP) 1, an original document is first transported from the original-document-transport portion 11 to the original-document-scanning portion 12, and then the scanning of the original document (the generating of image data) is performed by the original-document-scanning portion 12. The generated image data is temporarily stored in the RAM 142 by the control portion 10, and then is read back therefrom to be sent together with a print command to the engine control portion 15. Subsequently, the image data is sent from the engine control portion 15 to the image-forming portion 162, where a toner image is formed based on the image data on the surface of the photoconductive drum (unillustrated). Then, in the image-forming portion 162, the toner image is transferred onto paper transported from the paper-feeding portion 161 to the image-forming portion 162. Furthermore, after the toner image is fixed on the paper in the fixing portion 163, the paper is discharged to the finisher 164. In a case where, before the copying of the original document starts, the user has previously operated the operation/display portion 13 to request paper-stack-ejection processing or stapling, the paper that has undergone the copying process undergoes paper-stack-ejection processing or stapling in the finisher 164, and is then ejected onto one of the trays of the finisher 164.

The multifunction peripheral (MFP) 1 of this embodiment is characterized by the control that permits the number of pages to be output to be changed without the cancellation of a print job after the image data contained in the print job starts to be printed.

Figure 4:
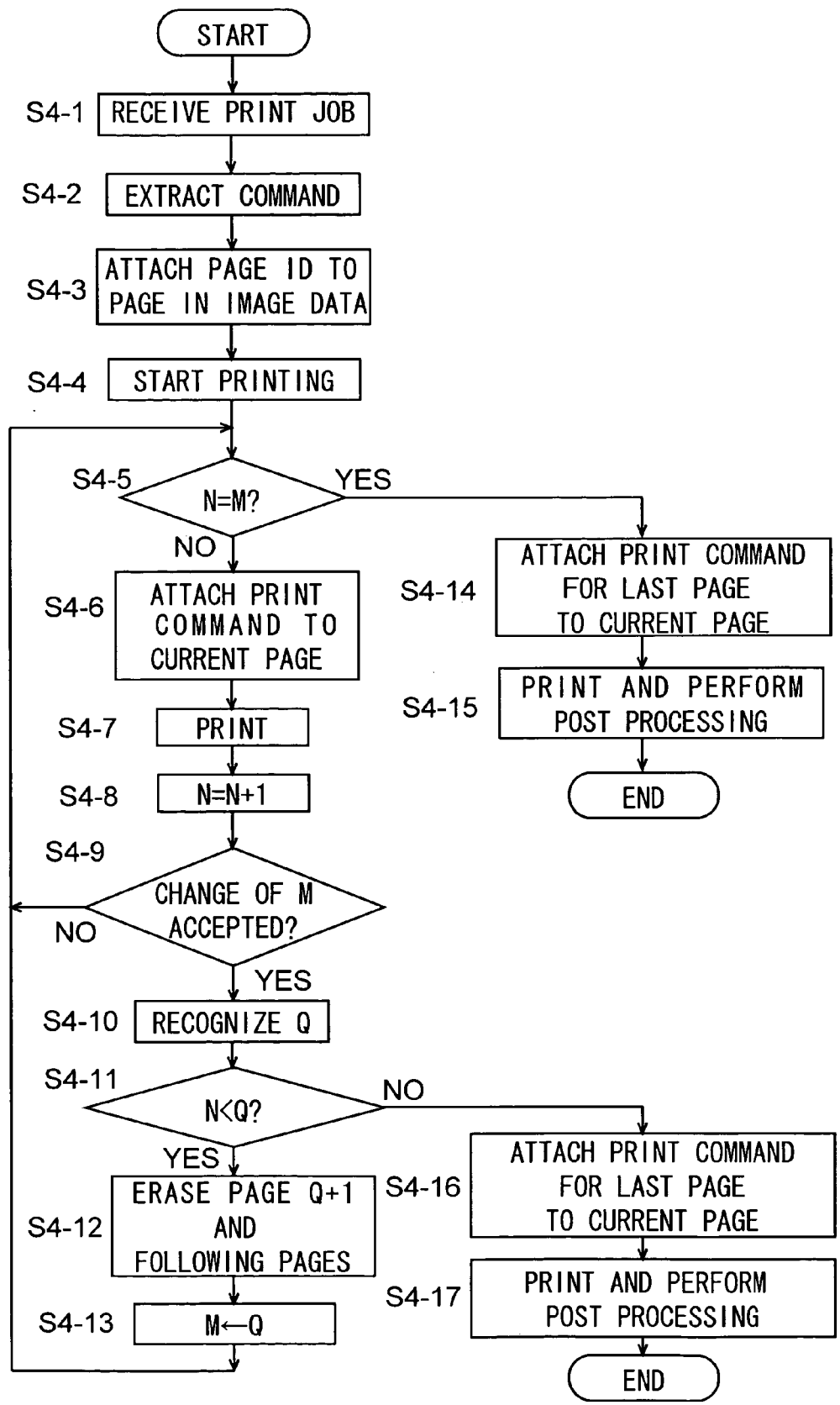
FIG. 4 is a flow chart illustrating how printing is controlled to continue after the number of pages to be output is changed in the multifunction peripheral (MFP) according to the present invention.

Hence, hereinafter, the feature described above will be described in detail with reference to the flow chart of FIG. 4. In FIG. 4, the last page M denotes the last page of the image data contained in a print job. The current page N denotes the page of the image data contained in the print job that is about to be printed on paper. The specified page Q denotes the page to which, during the execution of the print job, the last page of the print data contained in the print job has been changed. The last page M and the specified page Q fulfill the relationship Q<M.

In the multifunction peripheral (MFP) 1 of this embodiment, when, in step S4-1, the interface portion 17 receives a print job from the personal computer 31, the control portion 10 temporarily stores the print job in the RAM 142.

Subsequently, in step S4-2, the control portion 10 extracts, in addition to a print command for requesting the execution of the print job, commands such as a paper-stack-ejection command for requesting the print job to make the finisher 164 perform paper-stack-ejection processing with respect to printed sheets of paper and a stapling command for requesting the print job to make the finisher 164 perform stapling with respect to printed sheets of paper. When, in addition to a print command, a paper-stack-ejection command or a stapling command is contained in a print job, the paper-stack-ejection command or the stapling command is later used as the print command for the last page, and hence the control portion 10 sets a flag with respect to the paper-stack-ejection command or the stapling command.

Subsequently, in step S4-3, the control portion 10 extracts image data of one page after another from the print job, and then stores the extracted image data of one page after another along with corresponding page IDs (that is, page numbers) associated therewith in the RAM 142.

Figure 5:
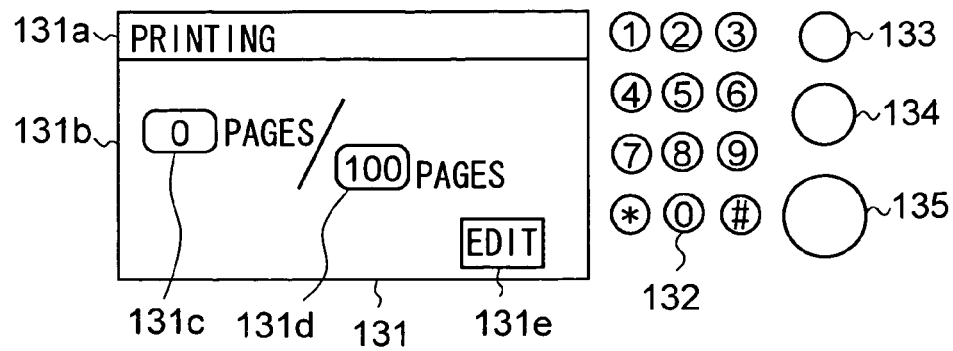
FIG. 5 is a diagram showing an example of an image displayed on the liquid crystal display 131 of the operation/display portion 13 when printing has just been started.

Subsequently, in step S4-4, the control portion 10 starts processing related to the execution of the print job. At this time, as shown in FIG. 5, the status-display portion 131a displays a message indicating that the printing is being performed. A "printed page" display portion 131c of the main display portion 131b displays how many pages have been printed. A "last page" display portion 131d of the main display portion 131b displays the last page M of the image data contained in the print job. Also, the main display portion 131b displays an edit button 131e that, when pressed after a print job starts to be executed, permits the last page M to be changed. When, in step S4-2, a paper-stack-ejection command or a stapling command is extracted, a figure, a letter, or a symbol may be displayed on the liquid crystal display 131 to indicate that paper-stack-ejection processing or stapling is going to be performed.

Subsequently, in step S4-5, the control portion 10 counts the current page N of the image data that is about to be printed on paper, and when N is found to be unequal to M (S4-5, NO), the processing proceeds to step S4-6, where the control portion 10 reads from the RAM 142 the image data of the current page N that is about to be printed on paper, attaches a print command thereto, and sends the image data along with the print command to the engine control portion 15.

In step S4-7, according to the print command, the engine control portion 15 sends the image data of the current page N to the image-forming portion 162, where a toner image is formed based on the image data on the surface of the photoconductive drum (unillustrated). Then, in the image-forming portion 162, the toner image is transferred onto paper transported thereto from the paper-feeding portion 161. Furthermore, after the toner image is fixed on the paper in the fixing portion 163, the printed paper is transported to the finisher 164.

Subsequently, in step S4-8, the control portion 10 increments the current page N to N+1.

Figure 6:
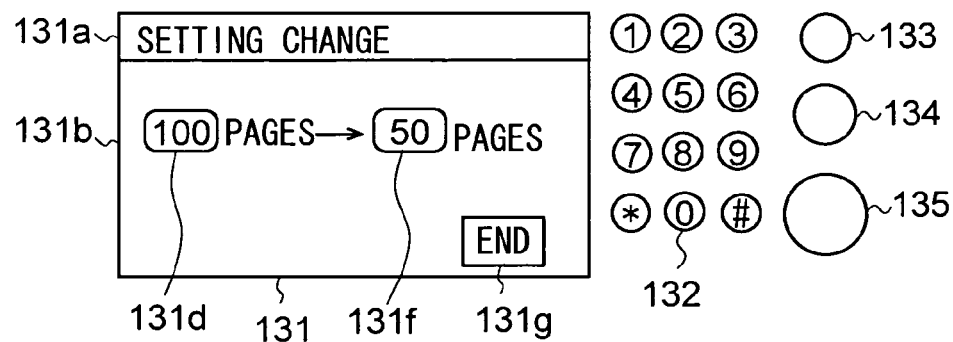
FIG. 6 is a diagram showing an example of an image displayed on the liquid crystal display 131 of the operation/display portion 13 for accepting a change in the setting of the last page M.

Subsequently, when, in step S4-9, the user presses the edit button 131e shown in FIG. 5, a signal resulting from its being pressed is fed to the control portion 10. And as shown in FIG. 6, the control portion 10 makes the liquid crystal display 131 display a screen for changing the setting of the last page M. The user inputs a specified page Q to a page-change-input portion 131f through the numeric keypad 132, and then presses an end button 131g. Then, when, as a result of the end button 131g being pressed, the change from the last page M to the specified page Q is accepted via the liquid crystal display 131 (S4-9, YES), the processing proceeds to step S4-10, where the liquid crystal display 131 feeds to the control portion 10 a signal indicating the specified page Q and the controller 10 recognizes the change from the last page M to the specified page Q.

On the other hand, in step S4-9, when the user does not change the last page M as described above and hence the change from the last page M to the specified page Q is not accepted via the liquid crystal display 131 (S4-9, NO), no change from the last page M to the specified page Q takes place and the processing returns to step S4-5.

Subsequently, in step S4-11, when the control portion 10 finds the current page N to be smaller than the specified page Q (S4-11, YES), the processing proceeds to step S4-12, where the control portion 10 erases, from the image data stored in the RAM 142 page-by-page along with page IDs associated therewith, the image data of page Q+1 and all the following pages.

Figure 7:
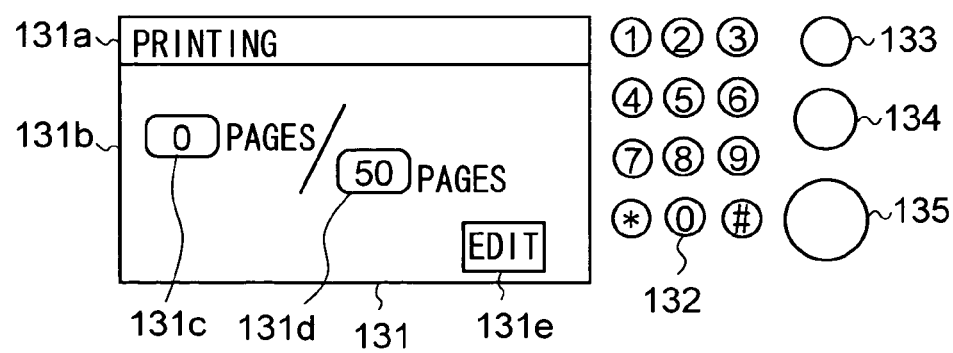
FIG. 7 is a diagram showing an example of an image displayed on the liquid crystal display 131 of the operation/display portion 13 after the last page M is changed.

Subsequently, in step S4-13, the control portion 10 recognizes the change of the value of the last page M to the value of the specified page Q, and also as shown in FIG. 7, the last page display portion 131d displays the value of the specified page Q, and the processing returns to step S4-5. Incidentally, once the last page M is changed to the specified page Q as described above, unless the setting of the last page M is changed again, the image data up to and inclusive of the specified page Q (page ID=Q) is going to be printed on paper.

When, in step S4-5, the control portion 10 counts the current page N of the image data that is about to be printed on paper and finds the current page N to be equal to the last page M (S4-5, YES), the processing proceeds to step S4-14, where the control portion 10 reads, of the image data stored page-by-page in the RAM 142 along with page IDs associated therewith, the image data of the current page N, attaches thereto a print command for the last page, and sends them together to the engine control portion 15. Incidentally, the print command for the last page is, when the control portion 10 has not set a flag with respect to either a paper-stack-ejection command or a stapling command, a command representing the last page M (for example, command_n=command_final); when the control portion 10 has set a flag with respect to a paper-stack-ejection command, a paper-stack-ejection command; and when the control portion 10 has set a flag with respect to a stapling command, a stapling command.

Subsequently, in step S4-15, according to the print command for the last page, the engine control portion 15 sends the image data of the last page M to the image-forming portion 162, and based on the image data, a toner image is formed on the surface of the photoconductive drum (unillustrated). Then, in the image-forming portion 162, the toner image is transferred onto paper transported thereto from the paper-feeding portion 161. Furthermore, after the toner image is fixed on the paper in the fixing portion 163, the printed paper is transported to the finisher 164. In the finisher 164, post processing is performed according to the print command for the last page, and then the printed paper is ejected onto the tray. Incidentally, in the finisher 164, when the print command for the last page is a command representing the last page M, the printed paper is ejected with no post processing performed thereon; when the print command for the last page is a paper-stack-ejection command, printed sheets of paper from the first page to the last page M are stacked in the sort portion and then ejected onto the tray; when the print command for the last page is a stapling command, printed sheets of paper from the first page to the last page M are stacked and stapled in the staple portion and then ejected onto the tray.

Incidentally, when, in step S4-1 described above, a print job requesting a plurality of copies to be printed has been received, after step S4-15 is completed, the control portion 10 controls in such a way that steps S4-4 to S4-17 are repeated until the printing of the set number of copies is completed.

When, in step S4-11, the control portion 10 finds the current page N to be not smaller (that is, greater) than the specified page Q (S4-11, NO), the processing proceeds to step S4-16, where the control portion 10 reads the image data of page N+1, which is the page next to the current page N, from the image data stored page-by-page in the RAM 142 along with page IDs associated therewith. Thereafter, the control portion 10 attaches a print command for the last page to the image data of page N+1, which is the page next to the current page N, and sends to the engine control portion 15 the image data of page N+1 together with the print command for the last page attached thereto.

Subsequently, in step S4-17, according to the print command for the last page, the engine control portion 15 sends the image data of page N+1, which is the page next to the current page N, to the image-forming portion 162, and based on the image data, a toner image is formed on the surface of the photoconductive drum (unillustrated). Then, in the image-forming portion 162, the toner image is transferred onto paper transported thereto from the paper-feeding portion 161. Furthermore, after the toner image is fixed on the paper in the fixing portion 163, the printed paper is transported to the finisher 164. In the finisher 164, post processing is performed according to the print command for the last page, and then the printed paper is ejected onto the tray. Incidentally, in the finisher 164, when the print command for the last page is a command representing the last page M, the printed paper is ejected with no post processing performed thereon; when the print command for the last page is a paper-stack-ejection command, printed sheets of paper of from the first page to the last page M are stacked in the sort portion and then ejected onto the tray; when the print command for the last page is a stapling command, printed sheets of paper of from the first page to the last page M are stacked and stapled in the staple portion and then ejected onto the tray.

Incidentally, in a case where a print job requesting a plurality of copies to be printed has been received in step S4-1, when, in addition to the flow chart shown in FIG. 4, a change from the last page M to the specified page Q has been accepted, the control portion 10 erases the image data of the page Q+1 and all the following pages stored in the RAM 142 page-by-page along with page IDs associated therewith. Then, under the control of the control portion 10, steps from S4-4 to S4-17 are repeated, that is, the printing of the image data from page 1 (page ID=1) to the specified page Q (page ID=Q) stored in the RAM 142 page-by-page along with page IDs associated therewith is repeated, until the printing of the set number of copies thereof is completed.

As described above, the multifunction peripheral (MFP) 1 of this embodiment is structured in such a way that, when the interface portion 17 receives a print job, the control portion 10 extracts image data of one page after another from the print job and stores the extracted image data of one page after another along with corresponding page IDs (that is, page numbers) associated therewith in the RAM 142, which serves as a storage portion; furthermore, after the printing of the image data contained in the print job is started, when the liquid crystal display 131 accepts an output-change instruction to end printing immediately after a specified page prior to the last page of the image data, of the image data stored in the RAM 142, only the image data corresponding to the pages up to and inclusive of the specified page Q is output. Hence, the multifunction peripheral (MFP) 1 of this embodiment permits the user, when he/she wants to change the number of output pages with respect to a print job that is currently being executed, to change the number of output pages without canceling the print job. Also, in the multifunction peripheral (MFP) 1 of this embodiment, the number of output pages can be changed in a single step involving the operation on the touch panel liquid crystal display 131 or with the numeric keypad 132, both of which serve as operation portions, to input the value of the specified page Q, and this makes it easy to change the setting from the last page M to the specified page Q (that is, the change of the number of output pages), which enhances user-friendliness.

Also, the multifunction peripheral (MFP) 1 of this embodiment is characterized by the control that permits the first page to be printed to be changed without the cancellation of a print job after the image data contained in the print job starts to be printed.

Figure 8:
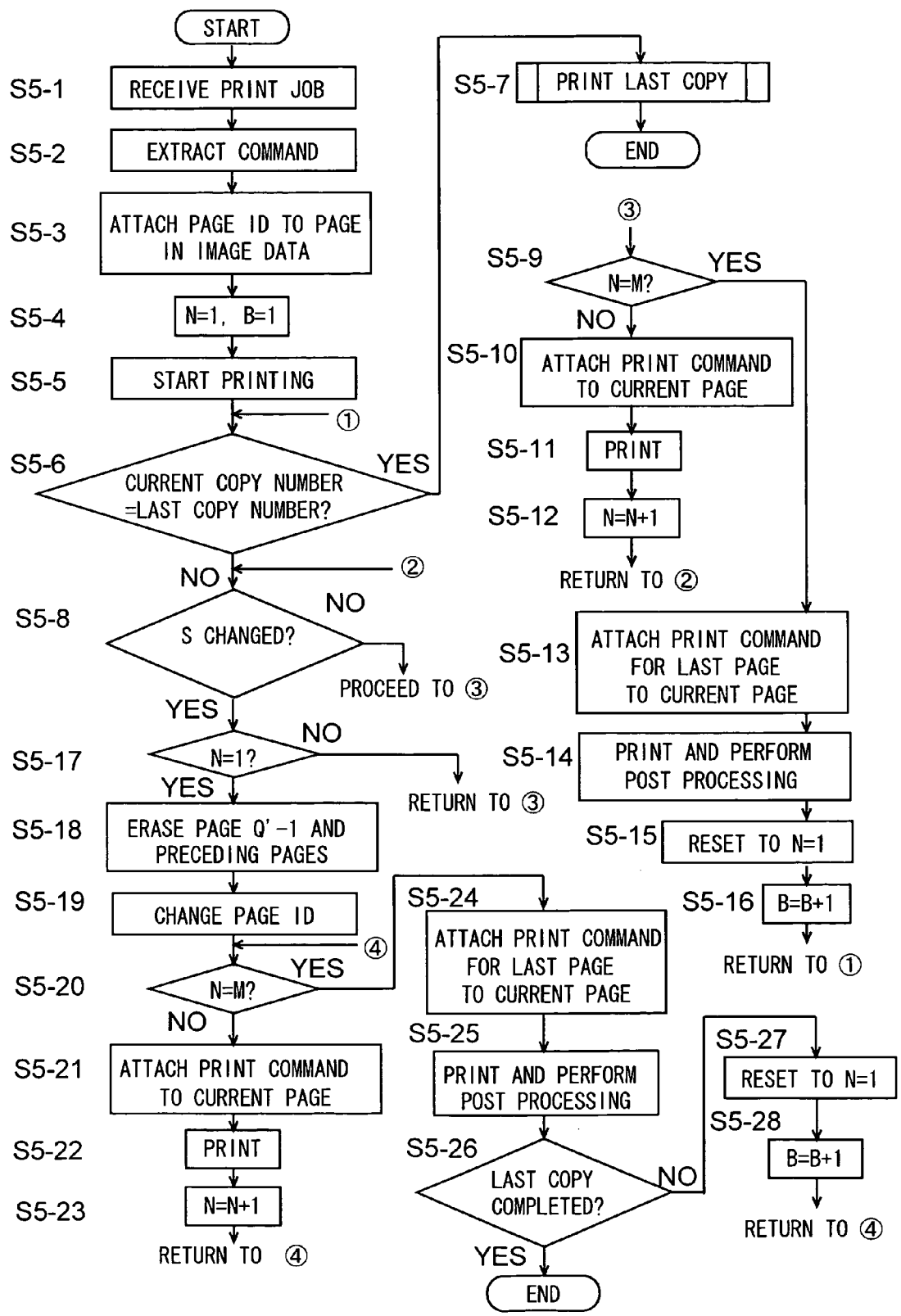
FIG. 8 is a flow chart illustrating an example of how printing is controlled to continue after the first page is changed in the multifunction peripheral (MFP) 1 according to the present invention.
Figure 9:
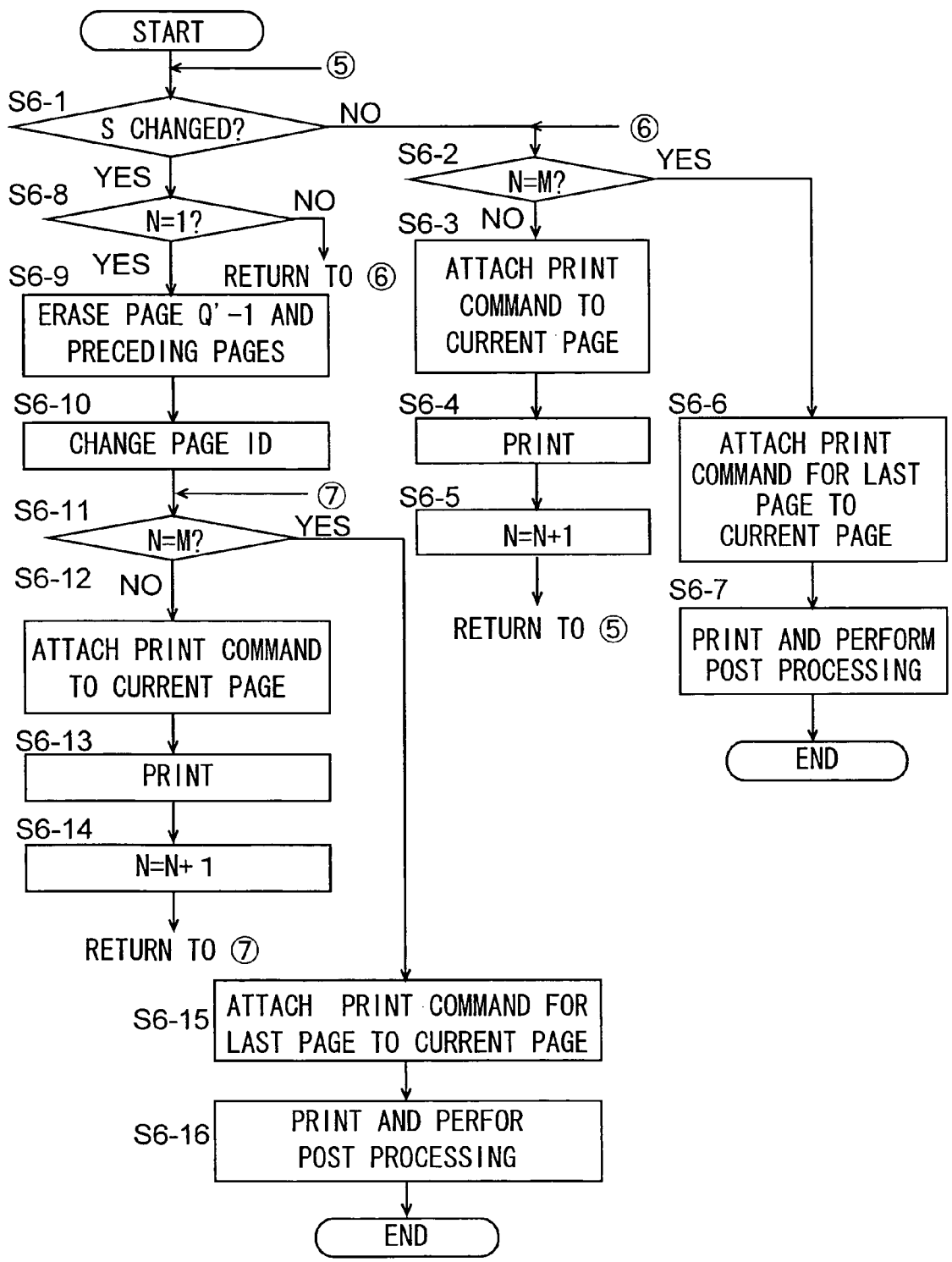
FIG. 9 is a flow chart illustrating an example of how printing is controlled with respect to the last copy in the multifunction peripheral (MFP) 1 shown in FIG. 8.

Hereinafter, with reference to the flow charts of FIGS. 8 and 9, the above feature will be described in detail. Incidentally, the first page S denotes the first page of the image data contained in the print job, the last page M denotes the last page of the image data contained in the print job, the current page N denotes the page of the image data contained in the print job that is about to be printed on paper, the specified page Q' denotes the page to which, during the execution of the print job, the first page S to be printed of the image data contained in the print job has been changed, and the current copy number B denotes the number of copies that are currently directed to be printed. Also, the first page S, the specified page Q', and the last page M fulfill the relationship S<Q'≤M.

In the multifunction peripheral (MFP) 1, in step S5-1, when the interface portion 17 receives a print job from the personal computer 31, the reception signal of the print job is fed from the interface portion 17 to the control portion 10. Then, based on the reception signal of the print job, the control portion 10 temporarily stores the print job in the RAM 142.

Subsequently, in step S5-2, the control portion 10 extracts, from the print job, commands such as a print-request command for requesting the execution of the image data contained in the print job, a print-copy-number command for specifying a predetermined number of copies to be printed of the image data contained in the print job, a paper-stack-ejection command for requesting the print job to make the finisher 164 perform paper-stack-ejection processing with respect to printed sheets of paper, and a stapling command for requesting the print job to make the finisher 164 perform stapling with respect to printed sheets of paper. Then, based on the print-request command and the print-copy-number command, the control portion 10 recognizes the predetermined number of copies to be printed of the image data contained in the print job and stores it in the RAM 142. Also, at this time, if, besides the print-request command and the print-copy-number command, the previously described paper-stack-ejection command or stapling command is contained in the print job, the paper-stack-ejection command or the stapling command is later used as the print command for the last page, and hence the control portion 10 sets a corresponding flag with respect to the paper-stack-ejection command or the stapling command.

Subsequently, in step S5-3, the control portion 10 extracts image data of one page after another from the print job stored in the RAM 142, and then stores the extracted image data of one page after another along with corresponding page IDs (that is, page numbers) associated therewith in the RAM 142.

Subsequently, in step S5-4, the control portion 10 sets both the current page N and the current copy number B to 1 (that is, N=1 and B=1) and stores them in the RAM 142 and the counting of the current page N and the counting of the current copy number B are started.

Figure 10:
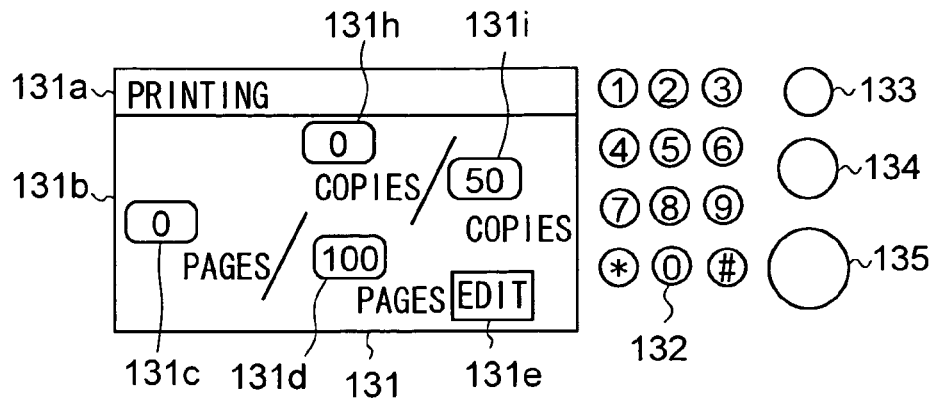
FIG. 10 is a diagram showing an example of an image displayed on the liquid display 131 before the first page S is changed.

Subsequently, in step S5-5, the control portion 10 starts processing related to the printing of the image data contained in the print job. At this time, as shown in FIG. 10, the control portion 10 makes the liquid crystal display 131 display images as follows: the status-display portion 131a displays a message indicating that the printing is being performed; a "printed page" display portion 131c of the main display portion 131b displays how many pages have been printed; and a "last page" display portion 131d displays the last page M of the image data with which a corresponding page ID is associated; a "printed copy number" display portion 131h of the main display portion 131b displays how many copies have been printed; a "specified copy number" display portion 131i displays how many copies of the image data contained in the print job are going to be printed based on the print-copy-number command. Also, the main display portion 131b displays an edit button 131e that, when pressed after processing related to the printing of the image data contained in the print job is started, permits the first page S to be changed. Incidentally, when, in step S5-2, a paper-stack-ejection command or a stapling command is extracted, a figure, a letter, or a symbol may be displayed on the liquid crystal display 131 to indicate that paper-stack-ejection processing or stapling processing is going to be performed.

Subsequently, in step S5-6, the control portion 10 reads from the RAM 142 the count number of the current copy number B, and when the current copy number B is found to be the last copy number (S5-6, YES), the processing proceeds to step S5-7, where the printing of the last copy is performed as described later.

Also, in step S5-6, the control portion 10 reads from the RAM 142 the count number of the current copy number B, and when the current copy number B is found not to be the last copy number (S5-6, NO), the processing proceeds to step S5-8, where, as described later, along with operation by the user to change the first page S to a specified page Q' being accepted via the liquid crystal display 131, the operation portion 10 checks whether or not the record of the change from the first page S to the specified page Q' that should be stored in the RAM 142 is actually stored in the RAM 142, and in this way it is checked whether or not the change from the first page S to the specified page Q' has been accepted.

And if the control portion 10 finds that the record of the change from the first page S to the specified page Q' is not stored in the RAM 142 and hence that the change of the first page S to the specified page Q' has not been accepted (S5-8, NO), the processing proceeds to step S5-9, where the control portion 10 recognizes the count number of the current page N stored in the RAM 142 and further checks whether or not the current page N is equal to the last page M. And when the control portion 10 finds that the current page N is unequal to the last page M (S5-9, NO), the processing proceeds to step S5-10, where the control portion 10 reads from the RAM 142 the image data corresponding to the current page N, then attaches a print command thereto, and sends the image data along with the print command to the engine control portion 15.

In step S5-11, according to the print command, the engine control portion 15 sends the image data corresponding to the current page N to the image-forming portion 162, where based on the image data, a toner image is formed on the surface of the photoconductive drum (unillustrated). And in the image-forming portion 162, the toner image is transferred onto paper transported to the image-forming portion 162 from the paper-feeding portion 161. Furthermore, in the fixing portion 163, the toner image is fixed on the paper, and then the printed paper is sent to the finisher 164.

Subsequently, in step S5-12, the control portion 10 increments the current page N to N+1, and the processing returns to step S5-8.

Also, when, in step S5-9, the control portion 10 finds the current page N to be equal to the last page M (S5-9, YES), the processing proceeds to step S5-13, where the control portion 10 reads, of the image data stored page-by-page in the RAM 142 along with page IDs associated therewith, the image data corresponding to the current page N, which is the last page M, attaches a print command for the last page to the image data corresponding to the current page N, and sends them together to the engine control portion 15. Incidentally, the print command for the last page is: when, in step S5-2, the control portion 10 has not set a flag with respect to either a paper-stack-ejection command or a stapling command, a command representing the last page M (for example, command_n=command_final); when, in step S5-2, the control portion 10 has set a flag with respect to a paper-stack-ejection command, a paper-stack-ejection command; and when, in step S5-2, the control portion 10 has set a flag with respect to a stapling command, a stapling command.

Subsequently, in step S5-14, according to the print command for the last page, the engine control portion 15 sends the image data corresponding to the last page M to the image-forming portion 162, and based on the image data, a toner image is formed on the surface of the photoconductive drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164. In the finisher 164, post processing is performed according to the print command for the last page, and then the printed paper is ejected onto the tray. Incidentally, in the finisher 164, when the print command for the last page is a command representing the last page M, the printed paper is ejected with no post processing performed thereon; when the print command for the last page is a paper-stack-ejection command, printed sheets of paper of from the first page S to the last page M are stacked in the sort portion and then ejected onto the tray; when the print command for the last page is a stapling command, printed sheets of paper of from the first page S to the last page M are stacked and stapled in the staple portion and then ejected onto the tray.

Subsequently, in step S5-15, the control portion 10 resets the count number of the current page N stored in the RAM 142 to 1 (that is, N=1).

Subsequently, in step S5-16, the control portion 10 increments the count number of the current copy number B stored in the RAM 142 to B+1 (that is, B=B+1), and the processing returns to step S5-6.

Also, when, in step S5-8, the control portion 10 finds that the record of the change from the first page S to the specified page Q' is stored in the RAM 142 and hence that the change of the first page S to the specified page Q' has been accepted (S5-8, YES), the processing proceeds to step S5-17, where the control portion 10 checks the count number of the current page N and determines whether or not, in the current copy number B, the printing of first page S is to be started. And when the control portion 10 finds that the current page N is equal to 1 and that, in the current copy number B, the printing of the first page S is to be started (that is, the current page N is the first page S) (S5-17, YES), the processing proceeds to S5-18, which will be described later. Also, when, in step S5-17, the control portion 10 finds that the current page N is unequal to 1 and that, in the current copy number B, the printing of the first page S is not to be started (that is, the current page N is not the first page S) (S5-17, NO), the processing proceeds to step S5-9, which is described above.

Figure 11:
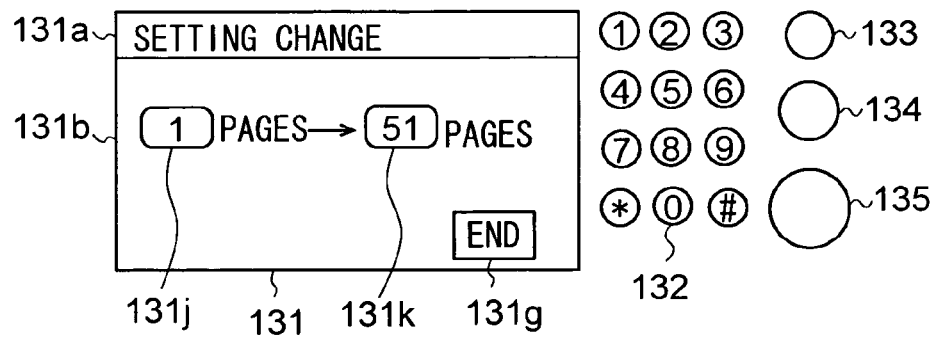
FIG. 11 is a diagram showing an example of an image displayed on the liquid crystal display 131 of the operation/display portion 13 for accepting a change in the setting of the first page S.

Now, hereinafter, how the change from the first page S to the specified page Q' is accepted in step S5-8 in the multifunctional peripheral (MFP) 1 will be described. In the multifunction peripheral (MFP) 1 of this embodiment, when the signal resulting from the user pressing the edit button 131e shown in FIG. 10 is fed to the control portion 10 from the liquid crystal display 131, the control portion 10, as shown in FIG. 11, makes the liquid crystal display 131 display a screen for changing the setting of the first page S. At this time, the main display portion 131b displays a first-page-display portion 131j on which "1" that is the first page S is being displayed, a specified-page-input portion 131k into which the change of the first page S is input, and an end button 131g that is pressed by the user when the input to the specified-page-input portion 131k is completed. Subsequently, the user inputs the specified page Q' to the specified-page-input portion 131k by using the numeric keypad 132, and along with the end button 131g being pressed by the user, the change of the first page S to the specified page Q' is accepted by the liquid crystal display 131. And a signal corresponding to the specified page Q' is fed from the liquid crystal display 131 to the control portion 10, and on receiving the signal, the control portion 10 stores the record of the change from the first page S to the specified page Q' in the RAM 142.

Subsequently, in step S5-18, based on the record of the change from the first page S to the specified page Q' stored in the RAM 142, the control portion 10 erases, from the image data stored in the RAM 142 page-by-page along with page IDs associated therewith, the image data of the page "the specified page Q'−1" and all the preceding pages.

Figure 12:
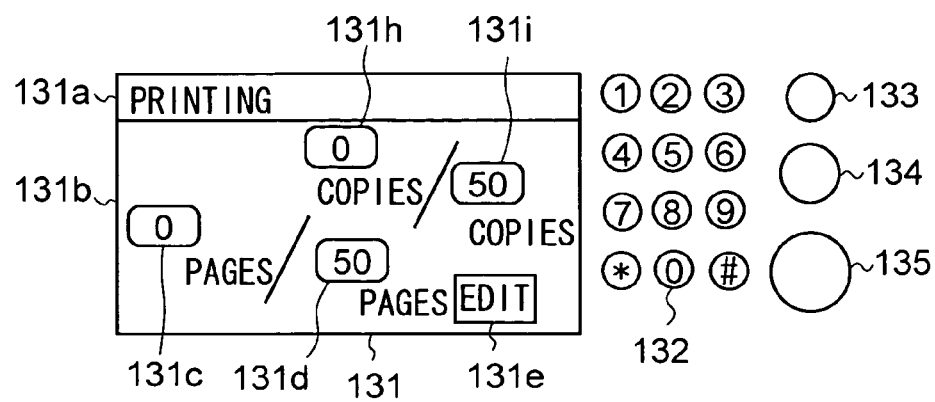
FIG. 12 is a diagram showing an example of an image displayed on the liquid crystal display 131 after the first page S has been changed.

Subsequently, in step S5-19, the control portion 10 changes the page IDs (that is, page numbers) each associated with image data corresponding to pages from the specified page Q' to the last page M remaining in the RAM 142 to new page IDs of from 1 to "the specified page Q'−1", respectively. For example, when the printing of from the first page S=1 to the last page M=100 has been changed to the printing of from the specified page Q'=51 to the last page M=100, the page IDs each associated with corresponding image data are changed, and hence image data corresponding to each of the pages from the specified page Q'=51 to the last page 100 now corresponds to the pages from the starting page S=1 to the last page M=50, respectively. As shown in FIG. 12, along with the just described change of page IDs, under control of the control portion 10, the last page display portion 131d of the liquid crystal display 131 displays "50" that is a new value of the last page M (that is, "the specified page Q'−1").

Subsequently, when, in step S5-20, the control portion 10 checks the count number of the current page N stored in the RAM 142 and further finds the current page N to be unequal to the last page M (S5-20, NO), the processing proceeds to step S5-21, where the control portion 10 reads from the RAM 142 the image data corresponding to the current page N, attaches a print command thereto, and sends the image data along with the print command to the engine control portion 15.

Subsequently, in step S5-22, according to the print command, the engine control portion 15 sends the image data corresponding to the current page N to the image-forming portion 162, where, based on the image data, a toner image is formed on the surface of the photoconductive drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164.

Subsequently, in step S5-23, the control portion 10 increments the current page N to N+1, and the processing returns to step S5-20.

Also, when, in step S5-20, the control portion 10 checks the count number of the current page N stored in the RAM 142 and further finds the current page N to be equal to the last page M (S5-20, YES), the processing proceeds to step S5-24, where the control portion 10 reads, of the image data stored page-by-page in the RAM 142 along with page IDs associated therewith, the image data corresponding to the current page N, which is the last page M, attaches thereto a print command for the last page, and sends them together to the engine control portion 15. Incidentally, the print command for the last page is: when, in step S5-2, the control portion 10 has not set a flag with respect to either a paper-stack-ejection command or a stapling command, a command representing the last page M (for example, command_n=command_final); when, in step S5-2, the control portion 10 has set a flag with respect to a paper-stack-ejection command, a paper-stack-ejection command; and when, in step S5-2, the control portion 10 has set a flag with respect to a stapling command, a stapling command.

Subsequently, in step S5-25, according to the print command for the last page, the engine control portion 15 sends the image data corresponding to the last page M to the image-forming portion 162, where based on the image data, a toner image is formed on the surface of the photoconductive-drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164. In the finisher 164, post processing is performed according to the print command for the last page, and then the printed paper is ejected onto the tray. Incidentally, in the finisher 164, when the print command for the last page is a command representing the last page M, the printed paper is ejected with no post processing performed thereon; when the print command for the last page is a paper-stack-ejection command, printed sheets of paper of from the first page S to the last page M are stacked in the sort portion and then ejected onto the tray; when the print command for the last page is a stapling command, printed sheets of paper of from the first page S to the last page M are stacked and stapled in the staple portion and then ejected onto the tray.

Subsequently, in step S5-26, the control portion 10 compares the count number of the current copy number B with the specified copy number both stored in the RAM 142, and if the control portion 10 finds the printing of the last copy to be uncompleted (S5-26, NO), then the processing proceeds to step S5-27, where the control portion 10 resets the count number of the current page N stored in the RAM 142 to 1 (that is, N=1).

Subsequently, in step S5-28, the control portion 10 increments the count number of the current copy number B stored in the RAM 142 to B+1 (that is, B=B+1), and the processing returns to step S5-20.

Also, in step S5-26, the control portion 10 compares the count number of the current copy number B with the specified copy number both stored in the RAM 142, and if the control portion 10 finds the printing of the last copy to have been completed (S5-26, YES), the whole operation is recognized to have been completed.

Next, how the printing of the last copy is performed in step S5-7 in the multifunction peripheral (MFP) 1 will be described. As shown in the flow chart of FIG. 9, in the multifunction peripheral (MFP) 1 of this embodiment, in step S6-1, as described in step S5-8, along with operation by the user to change the first page S to a specified page Q' being accepted by the liquid crystal display 131, the operation portion 10 checks whether or not the record of the change from the first page S to the specified page Q' that should be stored in the RAM 142 is actually stored in the RAM 142, and in this way it is checked whether or not the change from the first page S to the specified page Q' has been accepted.

And when the control portion 10 finds that the record of the change from the first page S to the specified page Q' is not stored in the RAM 142 and hence that the change of the first page S has not been accepted (S6-1, NO), the processing proceeds to step S6-2, where the control portion 10 checks the count number of the current page N stored in the RAM 142 and checks whether or not the current page N is equal to the last page M. And when the control portion 10 finds that the current page N is unequal to the last page M (S6-2, NO), the processing proceeds to step S6-3, where the control portion 10 reads from the RAM 142 the image data corresponding to the current page N, attaches a print command thereto, and sends the image data along with the print command to the engine control portion 15.

Subsequently, in step S6-4, according to the print command, the engine control portion 15 sends the image data corresponding to the current page N to the image-forming portion 162, where based on the image data, a toner image is formed on the surface of the photoconductive drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164.

Subsequently, in step S6-5, the control portion 10 increments the current page N to N+1 (that is, N=N+1), and the processing returns to step S6-1.

Also, when, in step S6-2, the control portion 10 finds the current page N to be equal to the last page M (S6-2, YES), the processing proceeds to step S6-6, where the control portion 10 reads, of the image data stored page-by-page in the RAM 142 along with page IDs associated therewith, the image data corresponding to the current page N, which is the last page M, attaches thereto a print command for the last page, and sends them together to the engine control portion 15. Incidentally, the print command for the last page is: when, in step S5-2, the control portion 10 has not set a flag with respect to either a paper-stack-ejection command or a stapling command, a command representing the last page M (for example, command_n=command_final); when, in step S5-2, the control portion 10 has set a flag with respect to a paper-stack-ejection command, a paper-stack-ejection command; and when, in step S5-2, the control portion 10 has set a flag with respect to a stapling command, a stapling command.

Subsequently, in step S6-7, according to the print command for the last page, the engine control portion 15 sends the image data corresponding to the last page M to the image-forming portion 162, and based on the image data, a toner image is formed on the surface of the photoconductive drum (unillustrated). And in the image-forming portion 162, the toner image is transferred onto paper transported thereto from the paper-feeding portion 161. Furthermore, after the toner image is fixed on the paper in the fixing portion 163, the printed paper is transported to the finisher 164. And in the finisher 164, post processing is performed according to the print command for the last page, and then the printed paper is ejected onto the tray, and thus the whole operation is completed. Incidentally, in the finisher 164, when the print command for the last page is a command representing the last page M, the printed paper is ejected with no post processing performed thereon; when the print command for the last page is a paper-stack-ejection command, printed sheets of paper of from the first page S to the last page M are stacked in the sort portion and then ejected onto the tray; when the print command for the last page is a stapling command, printed sheets of paper of from the first page S to the last page M are stacked and stapled in the staple portion and then ejected onto the tray.

Also, when, in step S6-1, the control portion 10 finds that the record of the change from the first page S to the specified page Q' is stored in the RAM 142 and hence that the change of the first page S to the specified page Q' has been accepted (S6-1, YES), the processing proceeds to step S6-8, where the control portion 10 checks the count number of the current page N and determines whether or not, in the current copy number B, the printing of the first page S is to be started. And when the control portion 10 finds that the current page N is equal to 1 and that, in the current copy number B, the printing of the first page S is to be started (that is, the current page N is the first page S) (S6-8, YES), the processing proceeds to S6-9 described later. Also, when, in step S6-8, the control portion 10 finds that the current page N is unequal to 1 and that, in the current copy number B, the printing of the first page is not to be started (that is, the current page N is not the first page S) (S6-8, NO), the processing proceeds to step S6-2 described above.

Subsequently, in step S6-9, based on the record of the change from the first page S to the specified page Q' stored in the RAM 142, the control portion 10 erases, from the image data stored in the RAM 142 page-by-page along with page IDs associated therewith, the image data of the page "the specified page Q'−1" and all the preceding pages.

Subsequently, in step S6-10, the control portion 10 changes the page IDs (that is, page numbers) of the image data of from the specified page Q' to the last page M that is still stored in the RAM 142 to new page IDs of from 1 to "the specified page Q'−1", respectively. For example, in the case where the printing of from the first page S=1 to the last page M=100 has been changed to the printing of from the specified page Q'=51 to the last page M=100, the page IDs each associated with each corresponding image data are changed, and hence each image data corresponding to the specified page Q'=51 to the last page M=100 now corresponds to the first page S=1 to the last page M=50, respectively.

Subsequently, when, in step S6-11, the control portion 10 checks the count number of the current page N stored in the RAM 142 and further finds the current page N to be unequal to the last page M (S6-11, NO), the processing proceeds to step S6-12, where the control portion 10 reads from the RAM 142 the image data corresponding to the current page N, attaches a print command thereto, and sends the image data along with the print command to the engine control portion 15.

Subsequently, in step S6-13, according to the print command, the engine control portion 15 sends the image data corresponding to the current page N to the image-forming portion 162, where based on the image data, a toner image is formed on the surface of the photoconductive drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164.

Subsequently, in step S6-14, the control portion 10 increments the count number of the current page N to N+1 (that is, N=N+1), and the processing returns to step S6-11.

Also, when, in step S6-11, the control portion 10 checks the count number of the current page N stored in the RAM 142 and further finds the current page N to be equal to the last page M (S5-11, YES), the processing proceeds to step S6-15, where the control portion 10 reads, of the image data stored page-by-page in the RAM 142 along with page IDs associated therewith, the image data of the current page N, which is the last page M, attaches thereto a print command for the last page, and sends them together to the engine control portion 15. Incidentally, the print command for the last page is: when, in step S5-2, the control portion 10 has not set a flag with respect to either a paper-stack-ejection command or a stapling command, a command representing the last page M (for example, command_n=command_final); when, in step S5-2, the control portion 10 has set a flag with respect to a paper-stack-ejection command, a paper-stack-ejection command; and when, in step S5-2, the control portion 10 has set a flag with respect to a stapling command, a stapling command.

Subsequently, in step S6-16, according to the print command for the last page, the engine control portion 15 sends the image data of the last page M to the image-forming portion 162, and based on the image data, a toner image is formed on the surface of the photoconductive drum (unillustrated). And in the image-forming portion 162, the toner image is transferred onto paper transported to the image-forming portion 162 from the paper-feeding portion 161. Furthermore, after the toner image is fixed on the paper in the fixing portion 163, the printed paper is transported to the finisher 164. And in the finisher 164, post processing is performed according to the print command for the last page, and then the printed paper is ejected onto the tray, and thus the whole operation is completed. Incidentally, in the finisher 164, when the print command for the last page is a command representing the last page M, the printed paper is ejected with no post processing performed thereon; when the print command for the last page is a paper-stack-ejection command, printed sheets of paper of from the first page S to the last page M are stacked in the sort portion and then ejected onto the tray; when the print command for the last page is a stapling command, printed sheets of paper of from the first page S to the last page M are stacked and stapled in the staple portion and then ejected onto the tray.

As described above, the multifunction peripheral (MFP) 1 of this embodiment is structured in such a way that, when the interface portion 17 receives a print job, the control portion 10 extracts image data of one page after another from the print job and stores the extracted image data of one page after another along with corresponding page IDs (that is, page numbers) associated therewith in the RAM 142, which serves as a storage portion; furthermore, after processing related to the printing of the image data contained in the print job is started, when the liquid crystal display 131 accepts an output-change instruction to output a specified page Q', which is posterior to the first page S, and all the following pages, if the control portion 10 finds the current page N to be the first page S, in the current copy number B and all the following copies, of the image data stored in the RAM 142, the image data corresponding to the specified page Q' and all the following pages is output, and in contrast, if the control portion 10 finds the current page not to be the first page S, with respect to the copy next to the current copy number and all the following copies, of the image data stored in the RAM 142, the image data corresponding to the specified page Q' and all the following pages is output. This permits the user, when he/she wants, with respect to a print job that is currently being executed, to change the first page of the printing without canceling the print job. Also, in the multifunction peripheral (MFP) 1 of this embodiment, with a single step of inputting the value of the specified page Q', which involves the operation on the touch panel liquid crystal display 131 or with the numeric keypad 132, both of which serve as operation portions, the setting can be changed from the first page S to the specified page Q' (that is, the change of the first page of printing). This contributes to enhanced user-friendliness.

The multifunction peripheral (MFP) 1 of the above described embodiment is so structured that, in step S4-9, a change of the last page M is accepted via the touch panel crystal display 131 and the numeric keypad 132 and that, in steps S-5-8 and S6-1, a change of the first page S to a specified page Q' is accepted via the touch panel crystal display 131 and the numeric keypad 132, but this is not meant to limit the present invention in any way, and the multifunction peripheral (MFP) 1 of the present invention may be so structured that numbers can be input via the liquid crystal display alone, without the need for the numeric keypad 132. This permits an easy change of the last page M or the first page S via the liquid crystal display alone. Instead of the touch panel liquid crystal display 131, a liquid crystal display without a touch panel function may be provided and a change of the last page M or the first page S may be accepted through operation of input keys such as a numeric keypad.

Also, in the multifunction peripheral (MFP) 1 of this embodiment, the last page M may be changed to a specified page Q or the first page S may be changed to a specified page Q' in such a way that the personal computer 31 sends an instruction to change the last page M to the specified page Q or to change the first page S to the specified page Q' to the multifunction peripheral (MFP) 1, which instruction is then received by the control portion 10 via the interface portion 17, and thus the last page M is changed to the specified page Q or the first page S is changed to the specified page Q' as described above. In addition to the above described advantages, this saves the user the trouble of walking up to the multifunction peripheral (MFP) 1 to change the last page M to a specified page Q or to change the first page S to a specified page Q', and thereby enhances user-friendliness. Incidentally, in this case, the controller 10 serves as information-accepting portion for accepting via the interface portion 17 input of information such as of a change from the last page M to a specified page Q or of a change from the first page S to a specified page Q'.

The multifunction peripheral (MFP) 1 of the embodiment described above is provided with a finisher 164; in practice, as will be understood from the foregoing, the present invention is applicable to a multifunction peripheral (MFP) without a finisher.

Incidentally, in the embodiment described above, a multifunction peripheral (MFP) having a printer function and a copier function is dealt with; in practice, the present invention finds wide application in image forming apparatuses in general such as printers, facsimile machines, and copiers.

The present invention may be practiced with various modifications and variations made otherwise than specifically described above within the spirit of the invention.

What is claimed is:
1. An image forming apparatus, comprising:
an information-accepting portion for accepting input of information;
an interface portion for establishing communication with an external device;
a printing portion for printing, on paper, image data contained in a print job received by the interface portion;
a storage portion for storing predetermined data; and
a control portion that provides:
an extraction portion that, when the interface portion receives a print job, extracts image data corresponding to successive pages from a first page to a designated last page of the print job and then stores the extracted image data corresponding to the successive pages, along with corresponding page numbers associated therewith, in the storage portion; and a page-change portion that, after the printing portion starts to print the image data to execute the print job as a current print job, responds to acceptance by the information-accepting portion of an output-change instruction to change the designated last page of the current print job to a specified page prior to the designated last page, printing portion to print out the image data from a next successive page to and inclusive of the specified page, wherein the next successive page is the page after a last page that was printed for the current print job after the output change instruction was accepted, and the control portion erases from the storage portion image data of all pages of the current print job following the specified page to thereby make the specified page the designated last page of the current print job.

2. The image forming apparatus of claim 1, wherein the information-accepting portion is an operation portion for accepting input of information through operation thereof.

3. The image forming apparatus of claim 1, wherein the information-accepting portion is a member for accepting input of information via the interface portion.

* * * * *